United States Patent
Kesler et al.

(10) Patent No.: US 11,060,653 B2
(45) Date of Patent: Jul. 13, 2021

(54) GAP FILLING SHIPPING CAP FOR LEVERAGED REFRIGERANT FITTING

(71) Applicant: Hanon Systems, Daejeon (KR)

(72) Inventors: Eric Kesler, Northville, MI (US); Dale Filhart, South Lyon, MI (US)

(73) Assignee: HANON SYSTEMS, Daejeon (KR)

( * ) Notice: Subject to any disclaimer, the term of this patent is extended or adjusted under 35 U.S.C. 154(b) by 65 days.

(21) Appl. No.: 16/519,247

(22) Filed: Jul. 23, 2019

(65) Prior Publication Data
US 2020/0049300 A1    Feb. 13, 2020

Related U.S. Application Data (60) Provisional application No. 62/716,433, filed on Aug. 9, 2018.

(51) Int. Cl.
| | |
|---|---|
| *F16L 55/115* | (2006.01) |
| *F16L 41/12* | (2006.01) |
| *F16L 41/02* | (2006.01) |
| *F16L 41/08* | (2006.01) |

(52) U.S. Cl.
CPC ............ *F16L 55/115* (2013.01); *F16L 41/02* (2013.01); *F16L 41/086* (2013.01); *F16L 41/12* (2013.01)

(58) Field of Classification Search
CPC ......... F16L 55/10; F16L 55/115; F16L 57/00; B65D 35/44
USPC ............................. 138/89; 215/250, 253, 256
See application file for complete search history.

(56) References Cited

U.S. PATENT DOCUMENTS

| | | | | |
|---|---|---|---|---|
| 5,496,141 A | * | 3/1996 | Popsys ............... | B65D 39/0023 138/89 |
| 5,884,788 A | * | 3/1999 | Wilde ................. | B65D 41/045 215/230 |
| 6,290,092 B1 | * | 9/2001 | Cote ..................... | B65D 59/02 220/796 |
| 6,758,244 B2 | * | 7/2004 | Workman ............... | F16L 55/11 138/89 |
| 6,802,698 B2 | * | 10/2004 | Tsukamoto .......... | F04B 39/123 318/89 |
| 7,621,568 B2 | | 11/2009 | Schroeder et al. | |

(Continued)

FOREIGN PATENT DOCUMENTS

| | | |
|---|---|---|
| CN | 104864201 A | 8/2015 |
| DE | 10261887 A1 | 7/2004 |

(Continued)

OTHER PUBLICATIONS

Chinese Office Action dated Apr. 2, 2021.

*Primary Examiner* — Patrick F Brinson
(74) *Attorney, Agent, or Firm* — Shumaker, Loop & Kendrick, LLP; James D. Miller (57) ABSTRACT

The block fitting assembly comprises a male block having a projecting portion extending from a planar face thereof and a sealing and capping element configured for engagement with the male block. The sealing and capping element includes a face portion for engaging the planar face of the male block and a cap portion projecting from the face portion. The cap portion includes a circumferentially extending sidewall having a webbed portion and a cover portion. The cover portion of the sidewall is configured to be separated from the cap portion by a tearing or shearing of the cap portion at the webbed portion of the sidewall.

20 Claims, 9 Drawing Sheets

(56) References Cited

U.S. PATENT DOCUMENTS

| | | | |
|---|---|---|---|
| 9,133,934 B2* | 9/2015 | Yoneda | F16J 15/02 |
| 9,261,194 B2* | 2/2016 | Kesler | F16J 15/061 |
| 2003/0080554 A1* | 5/2003 | Schroeder | F16L 23/18 |
| | | | 285/125.1 |
| 2006/0138073 A1* | 6/2006 | Ooka | B65D 41/3428 |
| | | | 215/344 |
| 2007/0273102 A1* | 11/2007 | Schroeder | F16J 15/062 |
| | | | 277/312 |
| 2014/0069133 A1 | 3/2014 | Becker | |

FOREIGN PATENT DOCUMENTS

| | | |
|---|---|---|
| DE | 102007047807 A1 | 5/2009 |
| JP | H06078696 U | 11/1994 |
| JP | H07113491 A | 5/1995 |
| KR | 20180006282 A | 1/2018 |

\* cited by examiner

GAP FILLING SHIPPING CAP FOR LEVERAGED REFRIGERANT FITTING

CROSS-REFERENCE TO RELATED APPLICATION

This patent application claims priority to U.S. Provisional Patent Application Ser. No. 62/716,433, filed on Aug. 9, 2018, the entire disclosure of which is hereby incorporated herein by reference.

FIELD OF THE INVENTION

The invention relates to a seal block fitting assembly for connecting fluid lines, and more specifically, to a shipping cap for sealing a gap present between a male seal fitting block and a female seal fitting block of the seal block fitting assembly.

BACKGROUND OF THE INVENTION

The components of a refrigerant circuit of a heating, ventilating, and air conditioning system are typically joined to each other by fluid lines extending between the components. Such fluid line connections are commonly formed between a male seal fitting block (hereinafter "the male block") and a cooperating female seal fitting block (hereinafter "the female block") forming a block fitting assembly. The male block includes a projecting portion and the female block includes a recessed portion configured to receive the projecting portion. The projecting portion and the recessed portion include aligned fluid flow paths that communicate with each other when the male and female blocks are coupled to each other. An annular primary sealing element is typically compressed between the projecting portion and the recessed portion to prevent the leakage of the fluid from the aligned fluid flow paths. The male and female blocks also typically include aligned fastener openings for receiving a fastener therethrough, such as a threaded stud or bolt configured to mate with a threaded nut, with the aligned fastener openings formed at a central region of each of the blocks adjacent the respective projecting portion or recessed portion thereof.

In some circumstances, one or both of the blocks may be capped or otherwise covered to prevent damage to each of the blocks during shipping and handling thereof. For example, it is not uncommon for the projecting portion of the male block to be at least partially covered or capped to both protect the surfaces of the projecting portion and to secure a position of the primary sealing member relative to the male block, such as when the primary sealing member is intended to be shipped while positioned within the projecting portion of the male block to avoid the need for subsequent assembly thereof.

One of the cooperating blocks typically includes a heel or raised portion at an end thereof. When the blocks are drawn towards each other by means of the centrally located fastener being tightened, the engagement of the heel of one of the blocks and a face of the other of the blocks tends to leverage the sealing forces present at the engagement between the projecting portion, the primary sealing element, and the recessed portion at an opposing end of each of the blocks. The inclusion of the heel therefore advantageously improves the seal present between the two blocks by increasing the compression forces acting on the compressed primary sealing element.

However, the inclusion of the heel for leveraging the blocks also tends to create gaps between portions of the male block and the female block due to the spacing of the heel surface from the surrounding portion of the corresponding block. Such gaps may form pathways between the blocks through which solid debris or contaminants can enter, wherein the presence of such contaminants between the blocks may lead to impairment of the function of the block fitting. Alternatively, the presence of such gaps may lead to the ingress of contaminants causing the corrosion of a portion of the block assembly, such as the primary sealing element typically compressed between the projecting and recessed portions of the cooperating blocks.

In view of the above, it would therefore be desirable to produce a sealing assembly for a block fitting assembly that acts as both a protective cap as well as a preventive sealing measure for preventing the entry of outside contaminants into a flow path formed by the cooperation of the blocks forming the block fitting assembly.

SUMMARY OF THE INVENTION

Compatible and attuned with the present invention, a sealing and capping element acting as a dual protective shipping cap and perimeter sealing member has surprisingly been discovered.

According to one embodiment of the present invention, a sealing and capping element configured for engagement with a male block of a block fitting assembly is disclosed. The sealing and capping element comprises a face portion configured to engage a substantially planar surface of the male block and a cap portion configured to cover a projecting portion of the male block. The cap portion projects from the face portion and includes a circumferentially extending sidewall having a webbed portion and a cover portion. The cover portion of the sidewall is configured to be removed from the cap portion by a tearing of the cap portion at the webbed portion of the sidewall.

According to another embodiment of the present invention, a block fitting assembly is disclosed. The block fitting assembly comprises a male block having a projecting portion extending from a planar face thereof and a sealing and capping element configured for engagement with the male block. The sealing and capping element includes a face portion for engaging the planar face of the male block and a cap portion projecting from the face portion. The cap portion includes a circumferentially extending sidewall having a webbed portion and a cover portion. The cover portion of the sidewall is configured to be removed from the cap portion by a tearing of the cap portion at the webbed portion of the sidewall.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-8 illustrate a block fitting assembly 10 utilizing a dual sealing and capping element 80 according to an embodiment of the present invention, which is hereinafter referred to only as the capping element 80 for simplicity and clarity. The block fitting assembly 10 may be used for connecting two fluid lines (not shown) conveying a refrigerant between different components of a refrigerant circuit, as desired. However, the block fitting assembly 10 and capping element 80 disclosed herein may be used in any type of fluid conveying system or circuit without departing from the scope of the present invention. The block fitting assembly 10 generally includes a male seal fitting block 20 (hereinafter "the male block 20"), a female seal fitting block 40 (hereinafter "the female block 40"), a primary sealing element 60, a fastener assembly 70, and the capping element 80 (shown in isolation in FIGS. 1 and 2).

Figure 3:
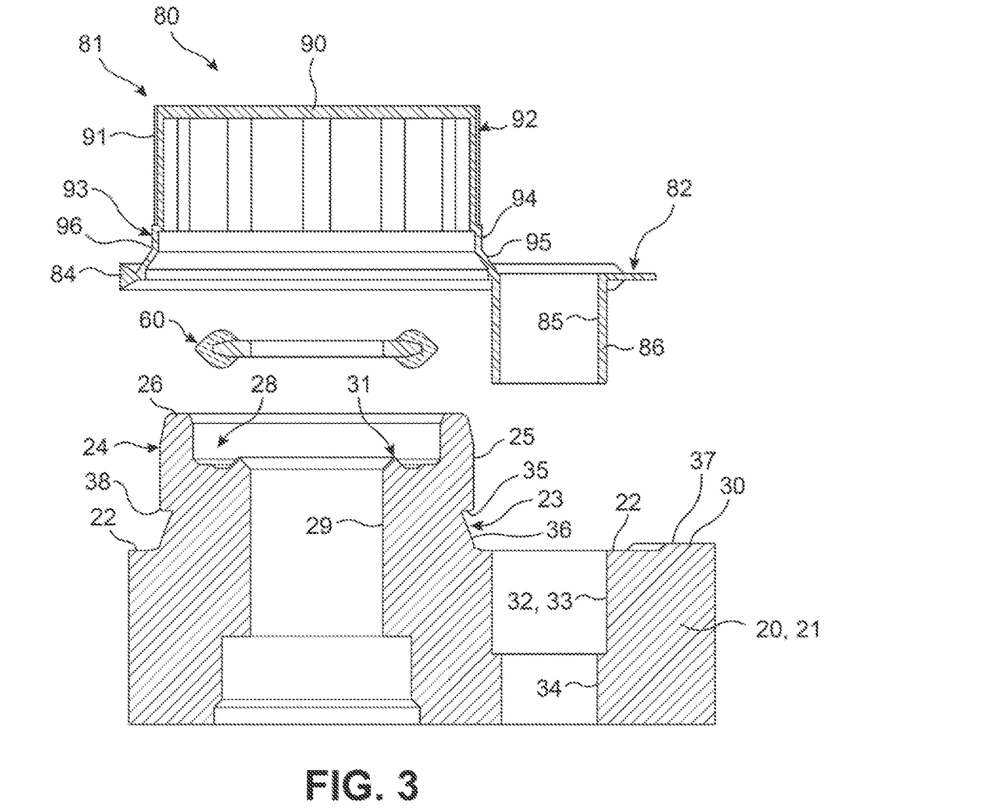
FIG. 3 is an exploded cross-sectional elevational view illustrating the sealing and capping element, a male block, and a primary sealing member prior to engagement of the sealing and capping element with the male block.
Figure 7:
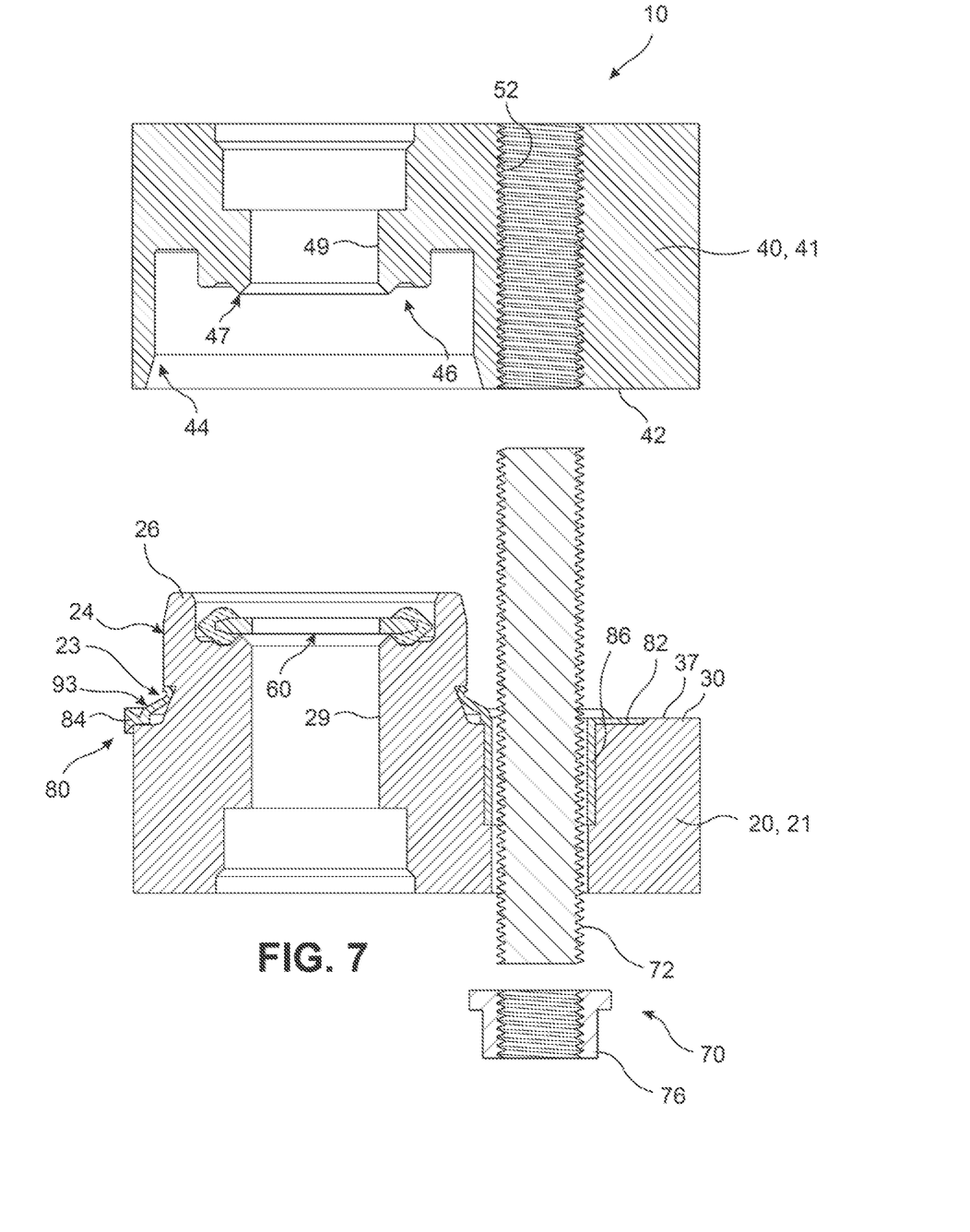
FIG. 7 is an exploded cross-sectional elevational view of the block fitting assembly prior to being fully assembled.
Figure 8:
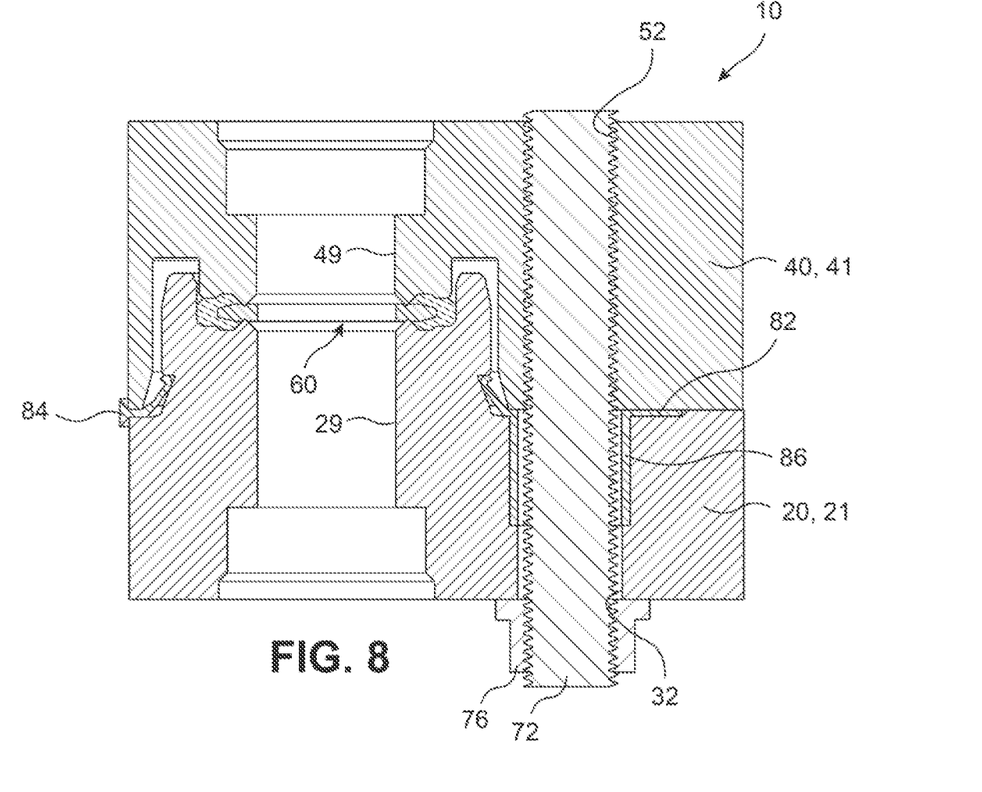
FIG. 8 is a cross-sectional elevational view of the block fitting assembly when in a fully assembled configuration.

As best shown in FIG. 3, the male block 20 includes a body 21 having a substantially planar face 22 configured to face towards the female block 40 when the blocks 20, 40 are in an assembled configuration (as shown in FIG. 8). A cylindrical projecting portion 24 extends axially from the planar face 22 adjacent one end of the body 21 and includes an outer circumferential surface 25 and an annular lip 26. The outer circumferential surface 25 of the projecting portion 24 tapers inwardly adjacent the lip 26 to form a piloting feature of the male block 20. The piloting feature aids in positioning the projecting portion 24 relative to a cooperating recessed portion 44 of the female block 40 (shown in FIG. 7).

The outer circumferential surface 25 of the projecting portion 24 further includes an undercut 23 formed therein intermediate the lip 26 and the planar face 22. The undercut 23 has a triangular cross-sectional shape formed by a radially extending surface 35 and a tapered surface 36 (best shown in FIG. 5), each of which extends annularly about the projecting portion 24. The tapered surface 36 tapers inwardly as the tapered surface 36 extends in an axial direction of the projecting portion 24 towards the lip 26 until the tapered surface 36 intersects the radially extending surface 35. The undercut 23 may have alternative cross-sectional shapes such as a substantially rectangular cross-sectional shape, without necessarily departing from the scope of the present invention.

The lip 26 surrounds a cylindrical opening 28 formed within the projecting portion 24. The opening 28 is partially defined by a radially extending seal engaging surface 31 including one or more teeth or grooves for engaging the primary sealing member 60 when the male block 20 and the female block 40 are in the assembled position. A cylindrical flow opening 29 extends transversely from the seal engaging surface 31 and is configured to receive a fluid to be conveyed through the block fitting assembly 10. The fluid may be conveyed directly through the flow opening 29 or the fluid may be conveyed through a tube or conduit (not shown) received in the flow opening 29, as desired.

The male block 20 further includes a leverage heel 30 extending axially from the planar face 22 at an end of the body 21 opposite the projecting portion 24. The leverage heel 30 includes an engaging surface 37 arranged parallel to and spaced from the planar face 22. The leverage heel 30 aids in leveraging the compressive forces applied to the block fitting assembly 10 when assembled together in the configuration of FIG. 8 in order to increase the compressive forces applied to the primary sealing member 60.

A fastener receiving opening 32 is formed in the body 21 intermediate the leverage heel 30 and the projecting portion 24 and extends through the body 21 from the planar face 22 to an oppositely arranged face of the body 21. The fastener receiving opening 32 includes a large diameter portion 33 intersecting the planar face 22 and a small diameter portion 34 formed adjacent the large diameter portion 33 and intersecting the opposing face of the body 21.

As shown in FIG. 7, the female block 40 is formed from a body 41 including a planar face 42 configured to face towards the planar face 22 of the male block 20 as well as the cylindrical recessed portion 44 indented axially from the planar face 42. The recessed portion 44 includes a shape and size substantially similar to a shape and size of the projecting portion 24 of the male block 20 allowing the projecting portion 24 to be received within the recessed portion 44. A cylindrical projection 46 extends from the recessed portion 44 and surrounds a cylindrical flow opening 49 formed through the body 41 for conveying the fluid therethrough. The fluid may be conveyed directly through the flow opening 49 or the flow opening 49 may be configured to receive a tube or conduit (not shown) for conveying the fluid, as desired. The flow opening 49 of the female block 40 is configured for concentric alignment and fluid communication with the flow opening 29 of the male block 20 when the blocks 20, 40 are in the assembled position of FIG. 8. The cylindrical projection 46 includes a seal engaging surface 47 having teeth, grooves, or similar structures suitable for engaging the primary sealing member 60 disposed between the projecting portion 24 of the male block 20 and the cylindrical projection 46 of the female block 40.

A fastener receiving opening 52 is formed through the female block 40 from the planar face 42 to an opposing face of the body 41. The fastener receiving opening 52 may be threaded to cooperate with a threaded fastener 72 of the fastener assembly 70 configured to extend through each of the fastener receiving opening 52 of the female block 40 and the fastener receiving opening 32 of the male block 20. A threaded nut 76 of the fastener assembly 70 may be received over one end of the threaded fastener 72 and used to compress the male block 20 towards the female block 40 via a turning of the nut 76. The drawing of the blocks 20, 40 towards each other promotes the compression of the primary sealing member 60 between the projecting portion 24 and the recessed portion 44, thereby sealing the boundary between the flow opening 29 of the male block 20 and the flow opening 49 of the female block 40.

Referring back to FIGS. 1 and 2, the capping element 80 includes a cap portion 81 for covering the projecting portion 24 of the male block 20 and a face portion 82 for engaging the planar face 22 thereof, wherein the cap portion 81 and the face portion 82 are formed integrally and monolithically from a common material. The common material may be any conventional sealing material having the requisite degree of elasticity, compressibility, resiliency, strength, and durability for the current application, as desired. The capping element 80 may be formed from a polymeric material, such as an elastomer, as desired. The polymeric material may be low density polyethylene, high density polyethylene, polypropylene, polycarbonate, acrylonitrile butadiene styrene, nylon, various plastics, high durometer rubber, and combinations thereof. It should further be understood that the capping element 80 may be formed from a composite material including any combination of elastomeric polymers and at least one filler material, as desired, without departing from the scope of the present invention. The integrally formed capping element 80 may be formed in a suitable molding process, as desired.

The face portion 82 of the capping element 80 is formed by a substantially planar wall of the capping element 80 extending to a perimeter of the planar face 22 of the male block 20 when the face portion 82 is placed in engagement with the planar face 22. A majority of a perimeter of the face portion 82 includes a sealing bead 84 with an enlarged cross-section for forming a seal at the perimeter of each of the planar face 22 of the male block 20 and the planar face 42 of the female block 40. However, the sealing bead 84 is absent along a portion of the perimeter of the planar face 22 intersecting a side surface of the leverage heel 30 so as not to interfere with operation of the leverage heel 30. The perimeter seal prevents the entry of contaminants or ambient air into a gap formed between the planar faces 22, 42 when the blocks 20, 40 are in the assembled position, which results from the presence of the leverage heel 30 spacing from the opposing faces 22, 42 from each other in the axial direction. The sealing bead 84 is shown as having a triangular cross-sectional shape, but alternative shapes may be used without departing from the scope of the present invention, such as a circular or elliptical shape, as desired. As best shown in FIG. 8, the sealing bead 84 may be positioned wherein the sealing bead 84 is directly compressed between an outer edge of the male block 20 and an outer edge of the female block 40, as desired.

The face portion 82 also includes an opening 85 formed therein and in concentric alignment with the fastener receiving opening 32 of the male block 20. A cylindrical post 86 projects axially from the face portion 82 in a direction opposite the direction of extension of the cap portion 81 and includes an inner circumferential surface defined by the opening 85. The post 86 has an outer diameter substantially equal to an inner diameter of the large diameter portion 33 of the fastener receiving opening 32 and an inner diameter substantially equal to the inner diameter of the small diameter portion 34 of the fastener receiving opening 32. The post 86 is configured for entry into the large diameter portion 33 of the fastener receiving opening 32 while the threaded fastener 72 is configured to be received through the opening 85 of the post 86 without substantial interference.

The cap portion 81 includes a radially extending top wall 90 and a circumferentially extending sidewall 91 depending downwardly from the top wall 90. The sidewall 91 includes a cover portion 92 adjacent the top wall 90 and a webbed portion 93 formed intermediate the cover portion 92 and the face portion 82 of the capping element 80.

Figure 1:
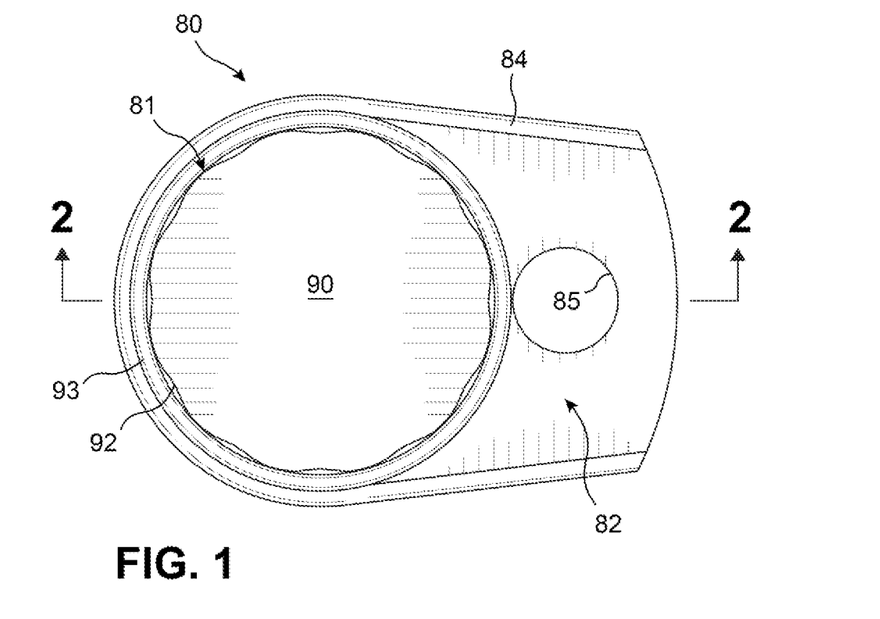
FIG. 1 is a top plan view of a sealing and capping element for use with a block fitting assembly according to an embodiment of the invention.
Figure 2:
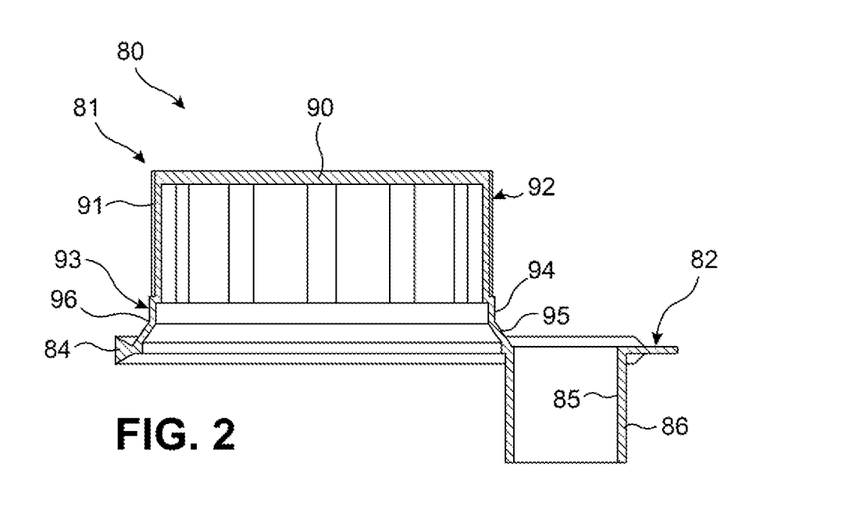
FIG. 2 is a cross-sectional elevational view of the sealing and capping element as taken through section lines 2-2 of FIG. 1.

As best shown in FIG. 1, the cover portion 92 may be knurled or otherwise textured to include a corrugated or wavy perimeter shape including alternating peaks and valleys extending circumferentially around a periphery of the sidewall 91. The cover portion 92 may alternatively include any circumferentially repeating surface feature suitable for improving an ability to grip the cover portion 92, as desired. In the provided embodiment, the corrugations of the cover portion 92 extend longitudinally in the axial direction of the cap portion 81 from the top wall 90 to the boundary of the webbed portion 93. The cover portion 92 extends a desired axial length suitable for covering the outer circumferential surface 25 of the projecting portion 24 intermediate the lip 26 and the undercut 23.

The webbed portion 93 may include a relatively small thickness in comparison to the remainder of the capping element 80 in order to promote a selective tearing of the capping element 80 at the webbed portion 93, as explained in greater detail hereinafter. The webbed portion 93 may include a cylindrical segment 94 formed immediately adjacent the cover portion 92 and a frustoconical segment 95 formed intermediate the cylindrical segment 94 and the face portion 82. The frustoconical segment 95 tapers outwardly as the frustoconical segment 95 extends axially from the cylindrical segment 94 towards the face portion 82. An outer circumferential surface of the webbed portion 93 accordingly includes a concave surface having an inwardly pointing edge 96 formed at the intersection of the axially extending cylindrical segment 94 and the inclined frustoconical segment 95. The surfaces adjoining at the edge 96 are accordingly arranged at an obtuse angle relative to each other.

An inner diameter of the cylindrical segment 94 of the webbed portion 93 may be selected to be slightly larger than a maximum outer diameter of the projecting portion 24 of the male block 20 to prevent interference therebetween when the capping element 80 is placed over the male block 20. The inner diameter of the cylindrical portion 94 of the webbed portion 93 may be between 0.0 and 0.20 mm greater diametrically than the outer diameter of the projecting portion 24, for example. The outward tapering of the frustoconical segment 95 further widens the webbed portion 93 for reception of the projecting portion 24 when the projecting portion 24 is first received into the cap portion 81. Conversely, an inner diameter of the cover portion 92 may be selected to be slightly smaller than a maximum outer diameter of the projecting portion 24 of the male block 20 to form interference therebetween when the capping element 80 is placed over the male block 20. The inner diameter of the cover portion 92 may be between 0.05 and 0.60 mm smaller diametrically than the outer diameter of the projecting portion 24, for example. The reduction in the inner diameter of the cover portion 92 results in the cover portion 92 being stretched radially outwardly when received over the projecting portion 24 of the male block 20, thereby aiding in securing the cap portion 81 of the capping element 80 on the projecting portion 24 of the male block 20.

Figure 4:
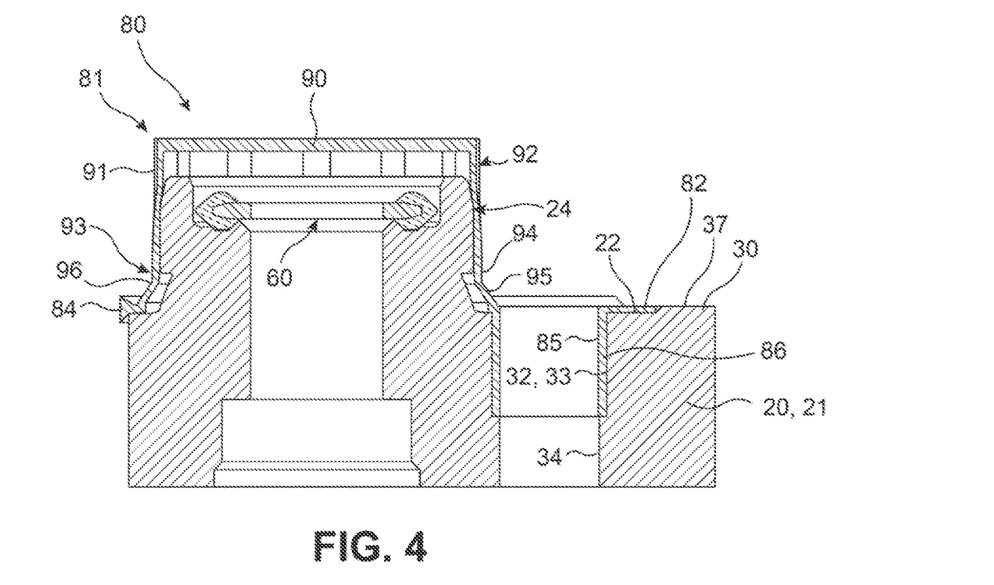
FIG. 4 is a cross-sectional elevational view showing a face portion of the sealing and capping element engaging a planar face of the male block while a cap portion of the sealing and capping element is initially received over a projecting portion of the male block.

Referring now to FIGS. 3-6, a method of securing the capping element 80 onto the male block 20 and removing the cover portion 92 from the cap portion 81 is disclosed. The primary sealing member 60 is first received onto the seal engaging surface 31 within the opening 28 of the projecting portion 24 to enclose the sealing member 60. Following the placement of the sealing member 60 within the opening 28, the capping element 80 is received on the male block 20 by first aligning the cap portion 81 and the post 86 of the capping element 80 with the projecting portion 24 and the fastener receiving opening 32 of the male block 20, respectively. The capping element 80 is moved towards the male block 20 to place the projecting portion 24 within the webbed portion 93 of the cap portion 81. Next, as shown in FIG. 4, the post 86 is received into the large diameter portion 33 of the fastener receiving opening 32 to secure one end of the capping element 80 to the male block 20 with at least a portion of the face portion 82 engaging the planar face 22 of the male block 20. The cap portion 81 is pressed axially further down along the projecting portion 24 while the cover portion 92, which has a decreased diameter in comparison to the projecting portion 24, is partially stretched over the projecting portion 24 with an axial portion of the cover portion 92 adjacent the top wall 90 still not yet in engagement with the projecting portion 24, as shown in FIG. 4.

Figure 5:
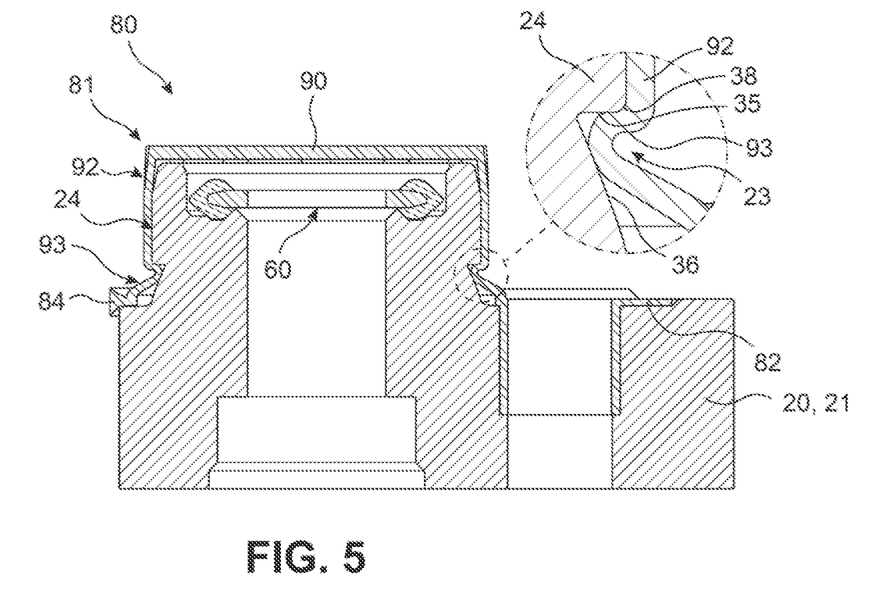
FIG. 5 is a cross-sectional elevational view showing the cap portion of the sealing and capping element when fully received over the projecting portion of the male block.

As shown in FIG. 5, a continued axial pressing of the cap portion 81 towards the face portion 82 causes the cover portion 92 of the cap portion 81 to eventually cover an entirety of the outer circumferential surface 25 of the projecting portion 24 intermediate the lip 26 and the undercut 23 while an entirety of the face portion 82 engages the planar face 22 of the male block 20. The axial pressing of the cap portion 81 towards the face portion 82 causes the webbed portion 93 to be compressed in the axial direction between the face portion 82 and the cover portion 92. The concavity of the webbed portion 93 caused by the existence of the angled orientation between the cylindrical segment 94 and the frustoconical segment 95 causes the webbed portion 93 to buckle inwardly towards the undercut 23 as the cover portion 92 of the sidewall 91 proceeds towards the face portion 82. The inward buckling of the webbed portion 93 causes the webbed portion 93 to at least partially correspond in shape to the undercut 23 while forming at least one circumferentially extending fold adjacent the radially extending surface 35 of the undercut 23. Specifically, the webbed portion 93 folds over an edge 38 formed at the intersection of the outer circumferential surface 25 and the radially extending surface 35 of the undercut 23.

The capping element 80 is accordingly fully received onto the male block 20 in a manner wherein the cover portion 92 covers the piloting feature of the projecting portion 24 to protect the projecting portion 24 during shipping and handling of the male block 20 and prior to subsequent assembly of the male block 20 to the female block 40. The sealing member 60 is also fully enclosed by the top wall 90 of the cap portion 81 to prevent removal of the sealing member 60 from the male block 20 during the shipping and handling thereof.

Figure 6:
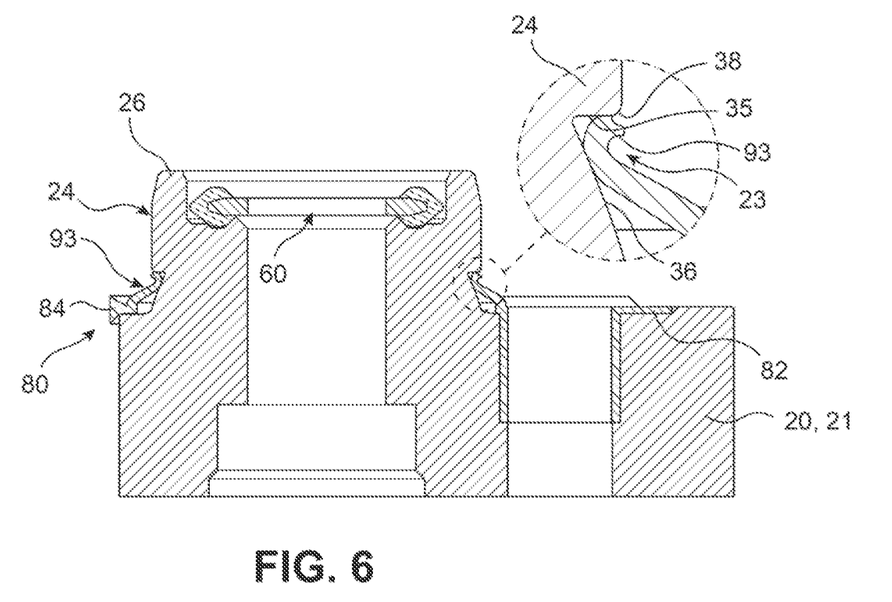
FIG. 6 is a cross-sectional elevational view showing the male block and sealing and capping element following removal of a segment of the cap portion of the sealing and capping element to expose a portion of the projecting portion of the male block.

Next, the cover portion 92 is removed from the cap portion 81 to expose the lip 26 of the projecting portion 24, thereby uncapping the piloting feature thereof. Specifically, the cover portion 92 is grasped and pulled or twisted to cause the capping element 80 to be stretched at the folds formed adjacent the boundary between the webbed portion 93 and the cover portion 92 until the webbed portion 93 fails via shearing. Specifically, the webbed portion 93 may fail when tensioned at the edge 38 during the twisting or pulling of the cover portion 92 relative to the webbed portion 93. The corrugations of the cover portion 92 aid in the grasping and twisting of the cover portion 92 relative to the webbed portion 93. The cover portion 92 accordingly tears away from the webbed portion 93 while an end of the webbed portion 93 maintained within the undercut 23 flares outwardly adjacent the radially extending surface 35 to maintain a position of the capping element 80 on the projecting portion 24 following the removal of the cover portion 92.

As shown in FIGS. 7 and 8, the male block 20 may be coupled to the female block 40 following the removal of the cover portion 92 and the exposure of the piloting feature of the projecting portion 24. The blocks 20, 40 are aligned to allow the threaded fastener 72 to extend through each of the fastener receiving openings 32, 52 while the projecting portion 24 is received into the recessed portion 44. A turning of the nut 76 draws the blocks 20, 40 together to compress the primary sealing member 60 between the projecting portion 24 and the recessed portion 44 while also concurrently compressing the sealing bead 84 between the planar faces 22, 42 of the respective blocks 20, 40, thereby establishing a seal around a perimeter of each of the planar faces 22, 42. The face portion 82 of the capping element 80 further fills any gaps present between the planar faces 22, 42 to prevent the introduction of contaminant or outside air into the flows openings 29, 49.

FIGS. 9-13 disclose a block fitting assembly 110 having a sealing assembly according to another embodiment of the present invention. The sealing assembly includes the capping element 80 as disclosed with respect to the first embodiment as well as an elastomeric O-ring 175. The male block 20 and the female block 40 are substantially identical to the blocks 20, 40 disclosed in FIGS. 1-8 with the exception of a modification to the outer circumferential surface 25 of the projecting portion 24 of the male block 20. The outer circumferential surface 25 differs by the inclusion of an undercut 123 formed in the outer circumferential surface 25 having a trapezoidal cross-sectional shape including a rectangular cross-sectional portion formed adjacent a triangular cross-sectional portion as opposed to the triangular cross-sectional shape of the undercut 23 of the block fitting assembly 10. The rectangular cross-sectional portion of the undercut 123 is configured to receive the O-ring 175 therein. The O-ring 175 may be positioned in abutment with a radially extending surface 135 defining an end surface of the undercut 123. The O-ring 175 and the undercut 123 may be dimensioned to cause an outermost surface of the O-ring 175 to extend radially outwardly beyond the outer circumferential surface 25 of the projecting portion 24. An outer diameter of the O-ring 175 is selected to be greater than an inner diameter of the recessed portion 44 of the female block 40 to cause the O-ring 175 to span a radially extending gap present between the projecting portion 24 and the recessed portion 44 when the blocks 20, 40 are assembled.

Figure 9:
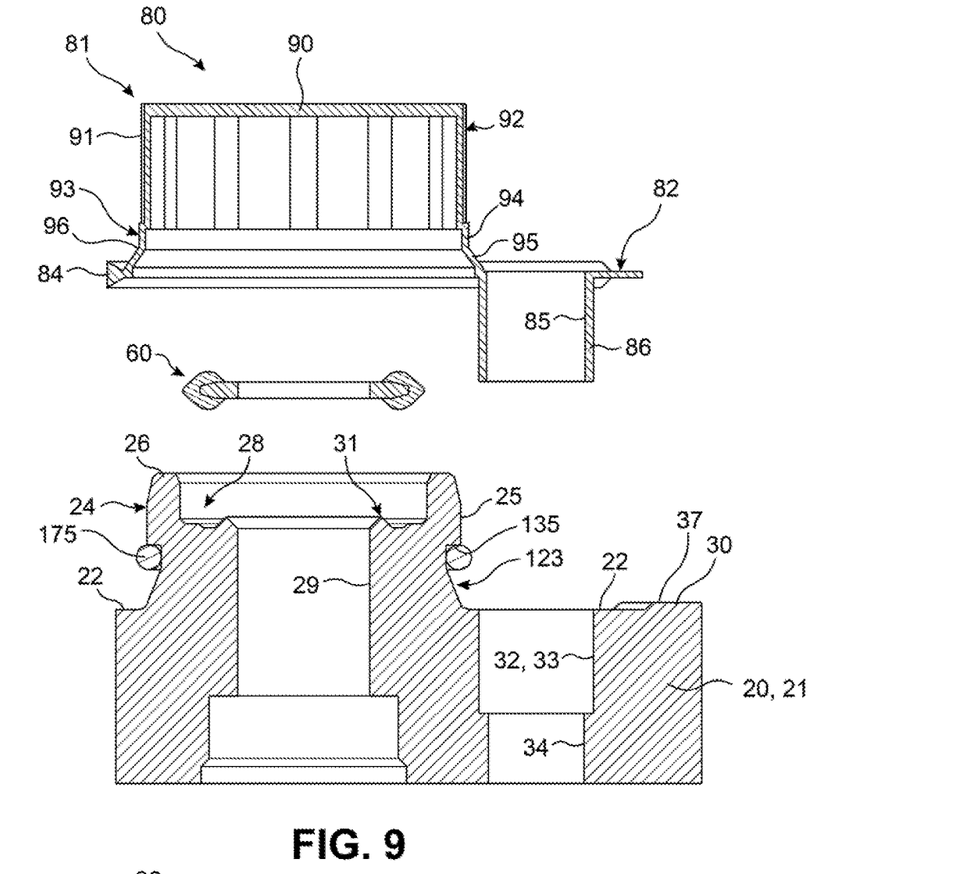
FIG. 9 is an exploded cross-sectional elevational view illustrating a sealing and capping element, a male block, and a primary sealing member of a block fitting assembly according to a second embodiment of the present invention.
Figure 10:
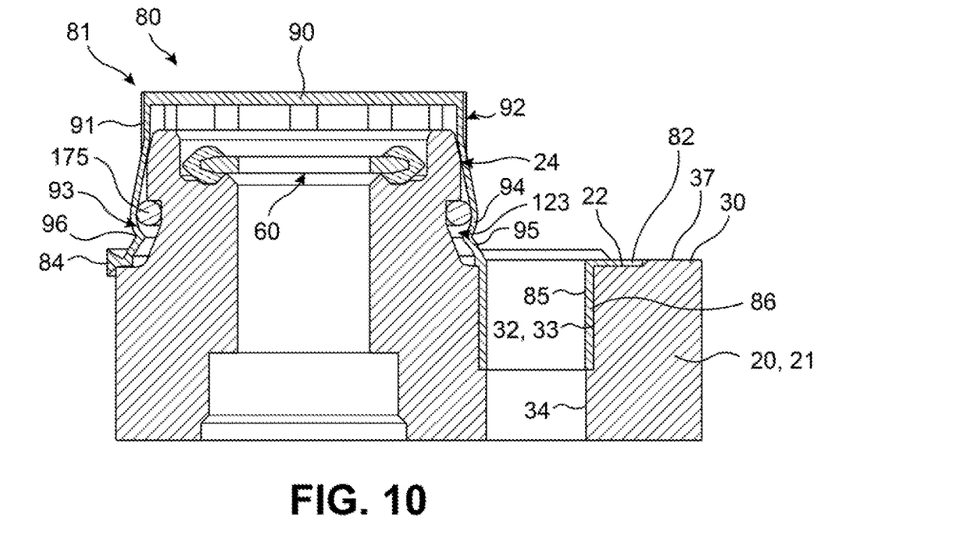
FIG. 10 is a cross-sectional elevational view showing a face portion of the sealing and capping element engaging a planar face of the male block while a cap portion of the sealing and capping element is initially received over a projecting portion of the male block having an O-ring.
Figure 11:
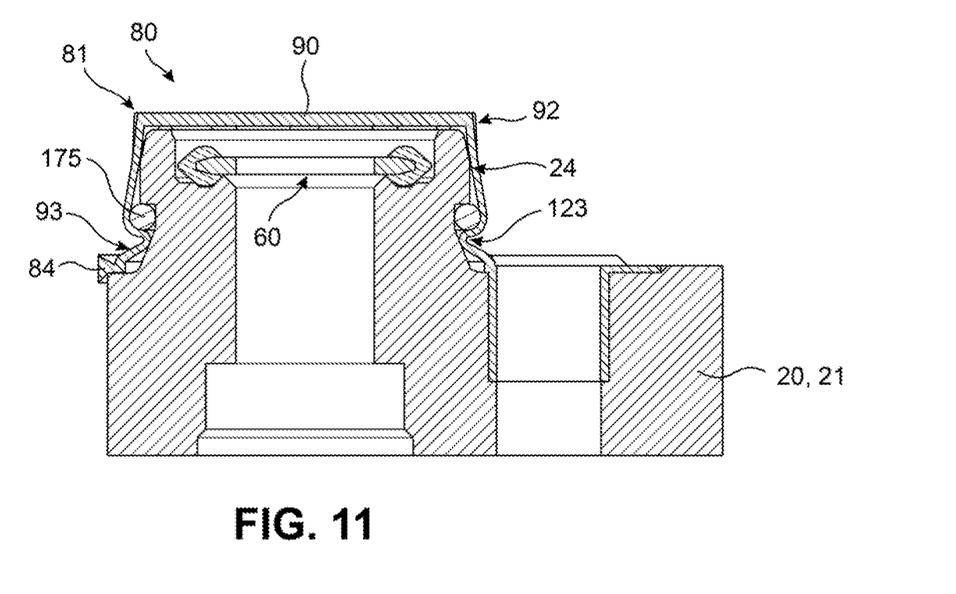
FIG. 11 is a cross-sectional elevational view showing the cap portion of the sealing and capping element when fully received over the projecting portion of the male block having the O-ring.
Figure 12:
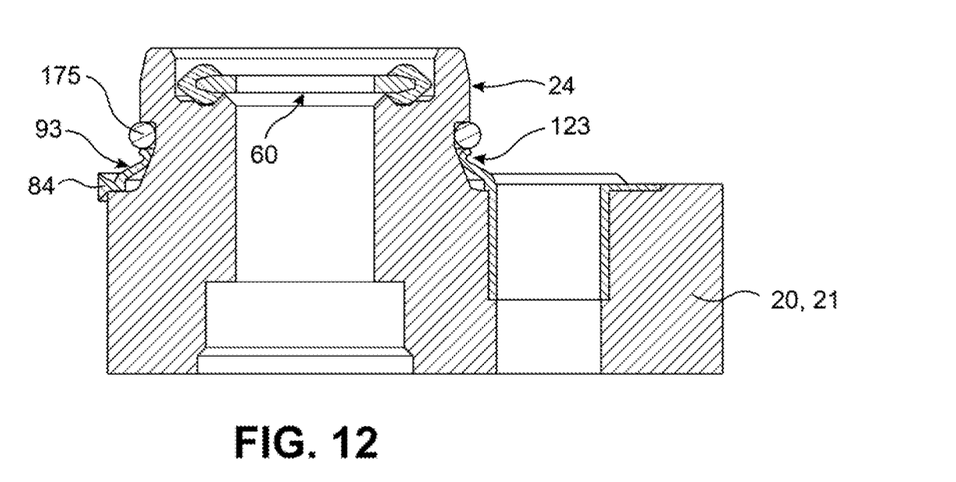
FIG. 12 is a cross-sectional elevational view showing the male block and sealing and capping element following removal of a segment of the cap portion of the sealing and capping element to expose a portion of the projecting portion of the male block having the O-ring.
Figure 13:
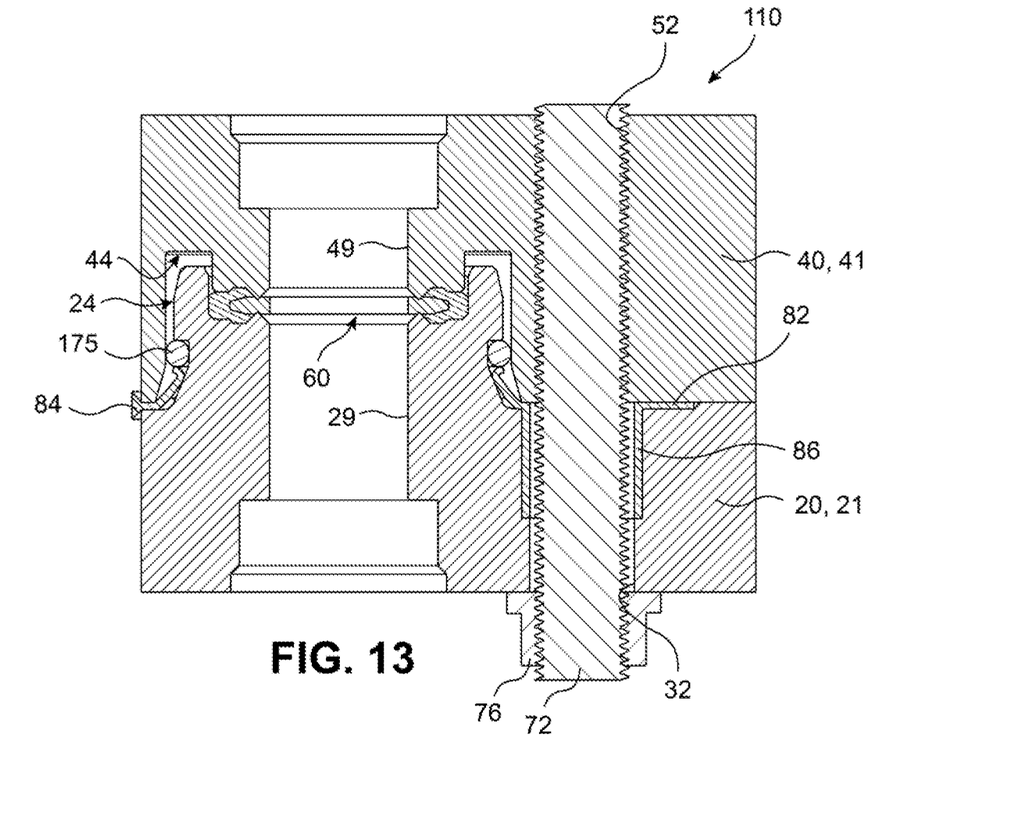
FIG. 13 is a cross-sectional elevational view of the block fitting assembly according to the second embodiment of the present invention when in a fully assembled configuration.

As shown in FIGS. 9-11, the capping element 80 is received over the projecting portion 24 and placed in contact with the planar face 22 of the male block 20 in the same manner as disclosed in FIGS. 3-5. As shown in FIG. 10, the initial axial pressing of the cap portion 81 over the projecting portion 24 causes the cover portion 92 to stretch outwardly over the O-ring 175. As shown in FIG. 11, continued axial pressing of the cap portion 81 causes the webbed portion 93 to buckle inwardly around the underside of the O-ring 175 and into the undercut 123. As shown in FIG. 12, the cover portion 92 is removed from the remainder of the cap portion 81 in the same manner as disclosed with reference to the block fitting assembly 10 to expose the piloting feature of the projecting portion 24. As shown in FIG. 13, the coupling of the blocks 20, 40 results in the sealing bead 84 sealing the perimeter of the planar faces 22, 42 of the blocks 20, 40 while the webbed portion 93 flares outwardly adjacent the O-ring 175. Additionally, the O-ring 175 bridges the gap between the projecting portion 24 of the male block 20 and an inner surface of the female block 40 defining the recessed portion 44 thereof to provide a seal therebetween. The O-ring 175 accordingly further prevents the ingress of contaminants into the block fitting assembly 110 while also preventing potential removal of the remainder of the capping element 80 from the male block 20 by preventing axial motion thereof.

The capping element 80 provides the advantage of forming a shipping cap prior to removal thereof and a gap seal following a coupling of the male block 20 to the female block 40. The inclusion of the cover portion 92 allows for easy gripping and twisting of the cap portion 81 for removal thereof. The relatively thin webbed portion 93 allows for the cover portion 92 to be easily removed to expose the piloting feature of the projecting portion 24. The concave surface formed by the inward indenting of the webbed portion 93 caused the webbed portion 93 to buckle inwardly in a predictable manner to conform to a shape of the corresponding undercut 23, 123. The inward buckling of the webbed portion 93 causes the webbed portion 93 to fold over an outer edge of the projecting portion 24 forming a surface for facilitating the tearing of the webbed portion 93. The sealing bead 84 further seals a perimeter of each of the blocks 20, 40 when the blocks 20, 40 are coupled together to further protect the primary sealing member 60.

Figure 14:
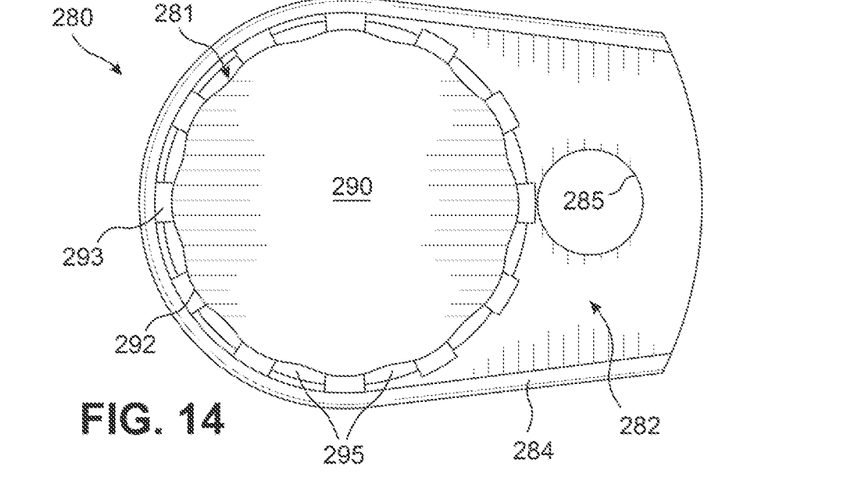
FIG. 14 is a top plan view of a sealing and capping element according to another embodiment of the invention.
Figure 15:
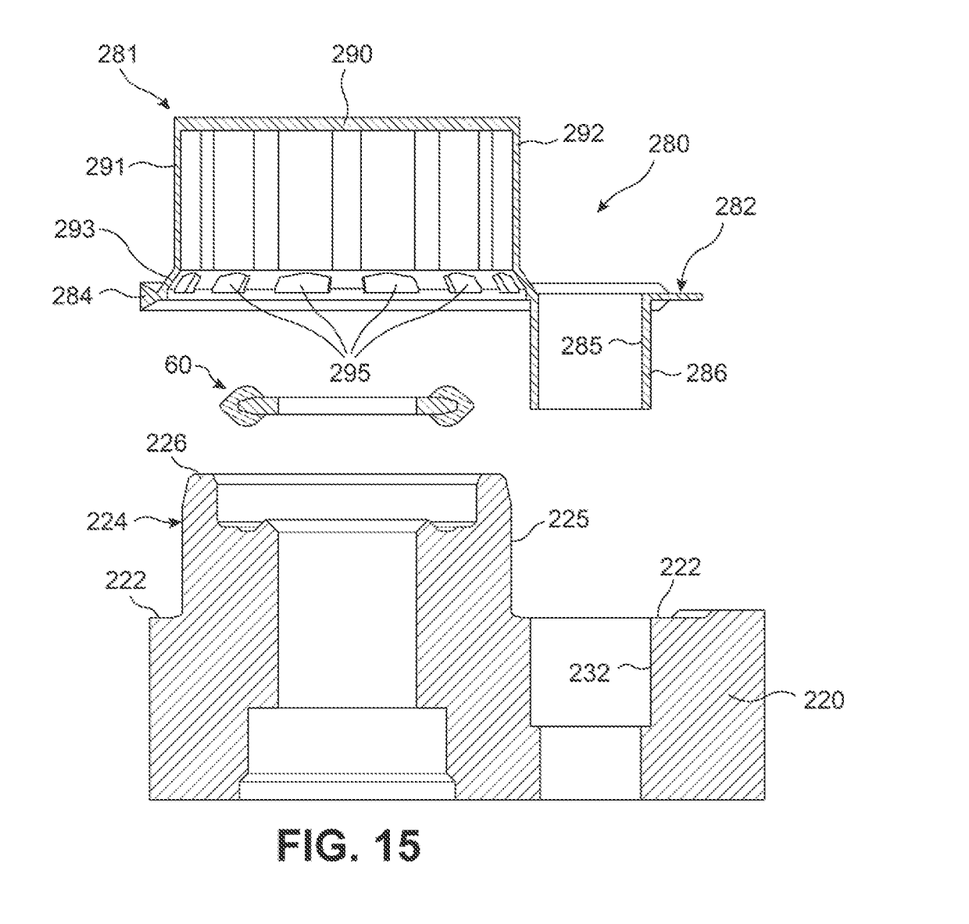
FIG. 15 is an exploded cross-sectional elevational view of the sealing and capping element of FIG. 14, a male block, and a primary sealing member prior to engagement of the sealing and capping element with the male block.

FIGS. 14 and 15 disclose a capping and sealing element 280 for use with a block fitting assembly 210 according to another embodiment of the present invention. The block fitting assembly 210 may include the female block 40 of the block fitting assembly 10 as disclosed in FIG. 7 and a modified male block 220. The male block 220 is substantially identical to the male block 20 of the block fitting assembly 10 except the male block 220 includes a modified projecting portion 224 devoid of the undercut 23 of the male block 20. The projecting portion 224 instead includes a cylindrical outer circumferential surface 225 arranged parallel to an axial direction of the projecting portion 224 that extends from a planar face 222 of the male block 220 to a lip 226 thereof. The male block 220 further includes a fastener receiving opening 232 extending through the male block 220 from the planar face 222 thereof to an opposing face thereof in identical fashion to the fastener receiving opening 32 of the male block 20.

The capping element 280 includes a cap portion 281 for covering the projecting portion 224 of the male block 220 and a face portion 282 for engaging the planar face 222 of the male block 220, wherein the cap portion 281 and the face portion 282 are formed integrally and monolithically from a common material. The common material may be any of the materials disclosed as forming the capping element 80. The face portion 282 of the capping element 280 is formed by a substantially planar wall of the capping element 280 extending to a perimeter of the planar face 222 of the male block 220 when the face portion 282 is placed in engagement with the planar face 222. A majority of a perimeter of the face portion 282 includes a sealing bead 284 with an enlarged cross-section for forming a seal at the perimeter of each of the planar face 222 of the male block 220 and the planar face 42 of the female block 40.

A cylindrical post 286 projects axially from the face portion 282 in a direction opposite the direction of extension of the cap portion 281 and includes an inner circumferential surface defining an opening 285. The post 286 is configured for entry into the fastener receiving opening 232 of the male block 220.

The cap portion 281 includes a radially extending top wall 290 and a circumferentially extending sidewall 291 depending downwardly from the top wall 290. The sidewall 291 includes a cover portion 292 adjacent the top wall 290 and a webbed portion 293 formed intermediate the cover portion 292 and the face portion 282 of the capping element 280. The cover portion 292 may be knurled to include a corrugated or wavy perimeter shape including alternating peaks and valleys extending circumferentially around a periphery of the sidewall 291. The cover portion 292 may alternatively include any circumferentially repeating surface feature or pattern suitable for improving an ability to grip the cover portion 292, as desired. In the provided embodiment, the corrugations of the cover portion 292 extend in the axial direction of the cap portion 281 from the top wall 290 to the boundary of the webbed portion 293 and the cover portion 292. An inner diameter of the cover portion 292 may be selected to be slightly smaller than a maximum outer diameter of the projecting portion 224 of the male block 220 to form interference therebetween when the capping element 280 is placed over the male block 220. The inner diameter of the cover portion 292 may be between 0.05 and 0.60 mm smaller diametrically than the outer diameter of the projecting portion 224, for example. The reduction in the inner diameter of the cover portion 292 results in the cover portion 292 being stretched radially outwardly when received over the projecting portion 224 of the male block 220, thereby aiding in securing the cap portion 281 of the capping element 280 on the projecting portion 224 of the male block 220.

The webbed portion 293 may be frustoconical in shape with the webbed portion 293 tapering outwardly as the webbed portion 293 extends from the cover portion 292 toward the face portion 282 of the capping element 280. The outward tapering of the webbed portion 293 causes a majority of the webbed portion 293 to include a greater inner diameter than the outer diameter of the projecting portion 224 to allow for the webbed portion 293 to be easily received over the projecting portion 224 while the cover portion 292 is stretched over the projecting portion 224. The webbed portion 293 further includes a plurality of circumferentially spaced openings 295 or perforations 295 formed therethrough. The openings 295 may have any suitable shape and size and may be spaced from each other by any suitable distance, as desired. The perforated webbed portion 293 facilitates removal of the cover portion 292 from the remainder of the capping element 280 via rotation of the cover portion 292 relative to the face portion 282 of the capping element 280. The webbed portion 293 may further include a relatively small thickness in comparison to the remainder of the capping element 280 in order to further promote the selective tearing of the capping element 280 at the webbed portion 293.

The capping element 280 operates similarly to the capping element 80. The capping element 280 is received over the projecting portion 224 of the male block 220 with the sealing member 60 positioned for placement within the male block 220 and the capping element 280. The capping element 280 is received over the projecting portion 224 until the face portion 282 of the capping element 280 abuts the planar face 222 of the male block 220 with the cover portion 292 contacting the outer circumferential surface 225 of the male block 220 and the webbed portion 293 disposed adjacent the planar face 222 of the male block 220.

The male block 220 is then ready for shipping and handling without risking damage to the projecting portion 224 of the male block 220 or the associated sealing member 60. The cover portion 292 may then be selectively removed from the remainder of the capping element 280 via a tearing or shearing of the capping element 280 at the webbed portion 293 thereof, which may be achieved by rotating the cover portion 292 relative to the webbed portion 293 to facilitate the tearing of the webbed portion 293 along the perforations 295 thereof. The female block 40 is then able to be coupled to the male block 220 to compress the sealing bead 284 between the male block 220 and the female block 40 in similar fashion to the capping element 80.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A sealing and capping element configured for engagement with a male block of a block fitting assembly, the sealing and capping element comprising:
   a face portion configured to engage a substantially planar surface of the male block; and
   a cap portion configured to cover a projecting portion of the male block, the cap portion projecting from the face portion and including a circumferentially extending sidewall having a webbed portion and a cover portion, wherein the cover portion of the sidewall is configured to be separated from the cap portion at the webbed portion of the sidewall.

2. The sealing and capping element of claim 1, further comprising a sealing bead surrounding at least a portion of a perimeter of the face portion.

3. The sealing and capping element of claim 1, wherein the cover portion of the sidewall is knurled to include a circumferentially extending corrugated profile.

4. The sealing and capping element of claim 1, wherein the cover portion of the sidewall extends from a top wall of the cap portion and the webbed portion is disposed intermediate the cover portion and the face portion.

5. The sealing and capping element of claim 1, wherein the webbed portion of the sidewall includes a frustoconical segment projecting from the face portion and a cylindrical segment adjacent the frustoconical segment, wherein the webbed portion is configured to buckle inwardly at an intersection of the frustoconical segment and the cylindrical segment when the webbed portion is compressed axially between the cover portion and the face portion.

6. A sealing and capping element configured for engagement with a male block of a block fitting assembly, the sealing and capping element comprising:
   a face portion configured to engage a substantially planar surface of the male block; and
   a cap portion configured to cover a projecting portion of the male block, the cap portion projecting from the face portion and including a circumferentially extending sidewall having a webbed portion and a cover portion, wherein the webbed portion of the sidewall is perforated.

7. The sealing and capping element of claim 1, wherein an entirety of the sealing and capping element is formed integrally from an elastomeric material.

8. A block fitting assembly comprising:
   a male block having a projecting portion extending from a planar face thereof; and
   a sealing and capping element configured for engagement with the male block, the sealing and capping element including a face portion for engaging the planar face of the male block and a cap portion projecting from the face portion, the cap portion including a circumferentially extending sidewall having a webbed portion and a cover portion, wherein the cover portion of the sidewall is configured to be separated from the cap portion at the webbed portion of the sidewall.

9. The block fitting assembly of claim 8, wherein the projecting portion of the male block includes an undercut formed in an outer circumferential surface thereof.

10. The block fitting assembly of claim 9, wherein the webbed portion of the sidewall is configured to buckle inwardly into the undercut when the webbed portion of the sidewall is compressed between the cover portion of the sidewall and the face portion.

11. The block fitting assembly of claim 9, wherein an O-ring is disposed within the undercut.

12. A block fitting assembly comprising:
   a male block having a projecting portion extending from a planar face thereof; and
   a sealing and capping element configured for engagement with the male block, the sealing and capping element including a face portion for engaging the planar face of the male block and a cap portion projecting from the face portion, the cap portion including a circumferentially extending sidewall having a webbed portion and a cover portion, wherein an outer surface of the webbed portion of the sidewall is concave in shape.

13. The block fitting assembly of claim 9A block fitting assembly comprising:
   a male block having a projecting portion extending from a planar face thereof; and
   a sealing and capping element configured for engagement with the male block, the sealing and capping element including a face portion for engaging the planar face of the male block and a cap portion projecting from the face portion, the cap portion including a circumferentially extending sidewall having a webbed portion and a cover portion, wherein the webbed portion of the sidewall is perforated.

14. The block fitting assembly of claim 8, wherein the projecting portion of the male block includes a seal engaging surface and the cap portion of the sealing and capping element includes a top wall from which the sidewall extends, wherein a sealing member is disposed between the seal engaging surface and the top wall when the sealing and capping element is engaging the male block.

15. The block fitting assembly of claim 8, wherein an entirety of the sealing and capping element is formed integrally from an elastomeric material.

16. A block fitting assembly comprising:
a male block having a projecting portion extending from a planar face thereof; and
a sealing and capping element configured for engagement with the male block, the sealing and capping element including a face portion for engaging the planar face of the male block and a cap portion projecting from the face portion, the cap portion including a circumferentially extending sidewall having a webbed portion and a cover portion, wherein the webbed portion of the sidewall includes a minimum inner diameter greater than a maximum outer diameter of the projecting portion of the male block, and wherein the cover portion of the sidewall includes a minimum inner diameter smaller than the maximum outer diameter of the projection portion of the male block.

17. The block fitting assembly of claim 8, further comprising a female block having a recessed portion indented from a planar face thereof, the recessed portion configured to receive the projecting portion of the male block.

18. The block fitting assembly of claim 17, wherein the face portion of the sealing and capping element seals a gap formed between the planar face of the male block and the planar face of the female block.

19. A sealing and capping element configured for engagement with a male block of a block fitting assembly, the sealing and capping element comprising:
a face portion configured to engage a substantially planar surface of the male block; and
a cap portion configured to cover a projecting portion of the male block, the cap portion projecting from the face portion and including a circumferentially extending sidewall having a webbed portion and a cover portion, wherein the webbed portion of the sidewall includes a frustoconical segment projecting from the face portion and a cylindrical segment adjacent the frustoconical segment, wherein the webbed portion is configured to buckle inwardly at an intersection of the frustoconical segment and the cylindrical segment when the webbed portion is compressed axially between the cover portion and the face portion.

20. A block fitting assembly comprising:
a male block having a projecting portion extending from a planar face thereof; and
a sealing and capping element configured for engagement with the male block, the sealing and capping element including a face portion for engaging the planar face of the male block and a cap portion projecting from the face portion, the cap portion including a circumferentially extending sidewall having a webbed portion and a cover portion, wherein the projecting portion of the male block includes an undercut formed in an outer circumferential surface thereof, and wherein the webbed portion of the sidewall is configured to buckle inwardly into the undercut when the webbed portion of the sidewall is compressed between the cover portion of the sidewall and the face portion.

* * * * *